United States Patent [19]

Berger

[11] 4,057,376
[45] Nov. 8, 1977

[54] DEVICE FOR DEGASSING PLASTIC MATERIALS

[75] Inventor: Pierre Berger, Saint-Etienne, France

[73] Assignee: Creusot-Loire, Paris, France

[21] Appl. No.: 709,524

[22] Filed: July 28, 1976

[30] Foreign Application Priority Data

Aug. 1, 1975 France .................. 75.24128

[51] Int. Cl.² .................................... B29B 1/10
[52] U.S. Cl. .................. 425/73; 159/2 E; 366/84; 425/203; 425/204; 425/376 R; 425/812
[58] Field of Search ............... 259/191, 192; 159/2 E; 425/812, 203, 204, 74, 73, 376 R; 264/176 R; 198/625; 100/146; 222/412

[56] References Cited

U.S. PATENT DOCUMENTS

| | | | |
|---|---|---|---|
| 3,268,949 | 8/1966 | Schmidt et al. | 425/204 X |
| 3,376,603 | 4/1968 | Colombo | 425/203 |
| 3,442,065 | 5/1969 | Foras | 159/2 E X |
| 3,642,752 | 2/1972 | Sutter | 425/203 X |
| 4,029,300 | 6/1977 | Morishima et al. | 425/203 X |

*Primary Examiner*—Francis S. Husar
*Assistant Examiner*—Mark Rosenbaum

[57] ABSTRACT

A device for degassing plastic materials comprising an extruder including at least three parallel screws intermeshing in pairs, arranged in a casing which follows the periphery of the screws and arranged around a central stem, the surface of which also follows the periphery of the screws so that the screws are encased over a substantial part of their periphery. The casing is provided with a supply inlet, an end plate through which degassed material is extruded and a degassing outlet through which gases are withdrawn, the degassing outlet being upstream with respect to the supply inlet.

5 Claims, 4 Drawing Figures

DEVICE FOR DEGASSING PLASTIC MATERIALS

FIELD OF THE INVENTION

The present invention relates to the degassing of thick or viscous materials such as plastic materials.

BACKGROUND OF THE INVENTION

In the manufacture of plastic materials, the materials are often subjected to a thorough degassing under vacuum which, among other things, enables impurities and water to be taken off, smells eliminated, and the viscosity of the product to be increased.

To carry out such degassing, there have been available for some time now extruders with several interleaved screws which enable the product to be rolled out into thin layers, which favors the formation of bubbles within the material. Under the influence of the vacuum, these bubbles are attracted towards the surface of the material, where they generally burst. This leads to the depositing of a skin which progressively coats the walls of the apparatus. The skin becomes oxidized and forms grains which can fall back into the material and contaminate it.

To overcome this disadvantage, it has already been proposed, in French patent no. 1,442,473, that the degassing orifice should be located substantially upstream in the material feed direction of the orifice which supplies the material to the screws. With this arrangement, the gases are moved in the opposite direction to the material, and the skins which are formed as the bubbles burst are immediately driven downstream with the material, without having time to become oxidzed, the part of the screws between the degassing material supply orifices causing a continuous scraping of the walls.

This arrangement has enabled the quality of the degassed material to be substantially improved. In conventional machines with two screws meshing with one another, however, it is difficult to increase the time for which the material is exposed to the vacuum. Moreover, there is a risk of the material filling the screw threads and blocking them as it moves progressively towards the degassing orifice.

SUMMARY OF THE INVENTION

It is an object of the invention to provide a degassing device which enables these disadvantages to be overcome and the results obtained to be improved.

It is another object of the invention to provide a device for degassing plastic material comprising an extruder including at least three parallel screws which intermesh in pairs, a casing surrounding said screws, a central stem extending axially of said casing and about which said screws are arranged, said stem having an outer surface in the form of semi-cylindrical surfaces each of which surrounds a portion of the periphery of a respective one of said screws, said casing defining supply orifice means for supplying plastic material to said screws and degassing orifice means connected to depressurizing means for removing gas from said plastic material, means for rotating said screws to feed material from said supply orifice means to one end of said casing, and an end plate closing said one end of said casing and defining channel means for removing plastic material from said casing, wherein said degassing orifice means are provided upstream of said supply orifice means with respect to the direction of feed of plastic material.

BRIEF DESCRIPTION OF THE DRAWINGS

The invention will be more fully understood from the following description of an embodiment thereof, given by way of example only, with reference to the accompanying drawings.

In the drawings.

DETAILED DESCRIPTION

Figure 1:
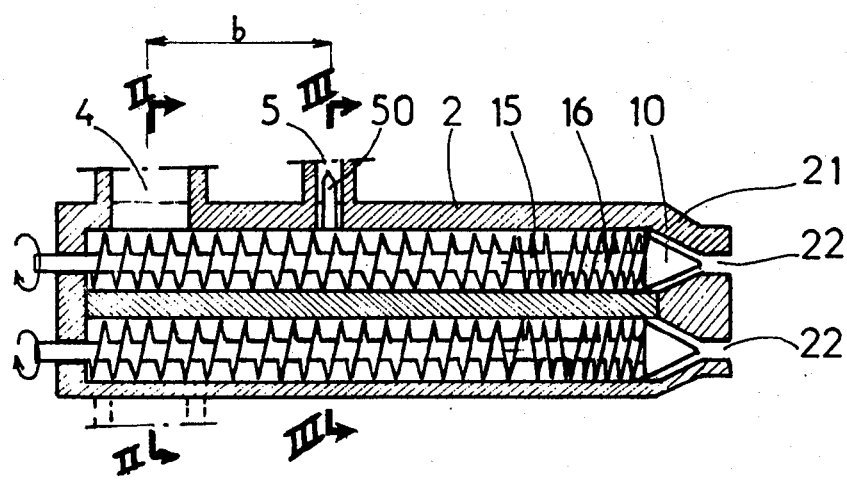
FIG. 1 is a longitudinal section through an embodiment of a device in accordance with the invention, taken on line I—I of in FIG. 2.

As shown in the drawings, the degassing device comprises four screws 11, 12, 13 and 14 which are tangential in pairs and located inside a casing 2 the inner surface of which is composed of semi-cylindrical surfaces 20 surrounding the outsides of the screws.

Inside the casing is located a central stem 3 with an outer surface composed of four semi-cylindrical sectors 30 surrounding the insides of the screws. As a result, the screws are encased over substantially their whole periphery, and the material is obliged to remain within the threads.

The screws are all driven in the same direction, causing the material to be driven from the upstream to the downstream end of the casing 2. Each screw ends in a point 10, and the casing comprises a downstream end plate 21 in which are four conical housings into each of which the point of a respective one of the screws enters, each housing being extended by a take-off channel 22.

The threaded portion of each screw along which the degassing takes place extends over the greater part of the length of the screw, and is followed in the known manner with a section 15 in which the pitch is reversed, which forms a plug, and a section 16 with closely spaced threads, which enables the material to be compressed.

Figure 2:
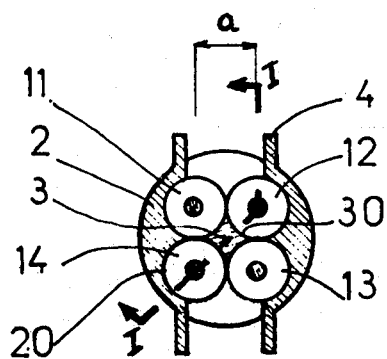
FIG. 2 is a transverse cross-section taken on line II—II of in FIG. 1.

The gases are taken off at the upstream end of the device. Two take-off orifices 4 will normally be used, diametrically opposed to one another and each centered on a plane which is tangential to a pair of screws, as shown in FIG. 2. The diameter of each degassing orifice 4 is preferably greater than the distance $a$ between the axes of the pair of screws.

The molten material to be degassed is introduced downstream of the take-off orifices 4 through supply orifices 5. The axes of the supply orifices 5 are located at a distance $b$ from the axes of the take-off orifices 4, where $b$ is from four to eight times the pitch of the threads in the degassing region, depending on the viscosity of the material.

Figure 3:
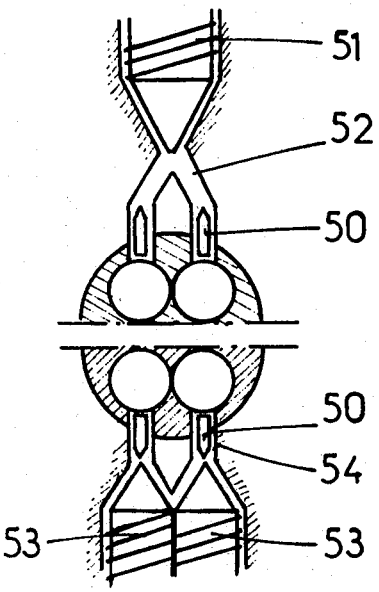
FIG. 3 is a transverse cross-section taken on line III—III.

Two ways of supplying the material have been shown in FIG. 3, by way of example only. Preferably, one supply orifice is provided for each screw, and each orifice comprises a tubular conduit on the axis of which is located a central mandrel 50 with a diameter less than that of the conduit, so that the material is brought to the periphery of the screws in the form of a hollow tube. This arrangement favors the spreading of the material on the screws. Moreover, steps will be taken to ensure that the flow of material will be virtually constant, so that the threads of the screws will be filled in a regular manner. To this end, one of the two arrangements shown by way of example could be used. The arrangement shown in the upper part of FIG. 3 comprises a single screw 51 surrounded by a sheath which has at its downstream end two divergent openings 52, each of which leads to a screw. In the arrangement shown in the lower part of FIG. 3, two supply screws 53 are used, their axes intersecting those of the screws of the degassing device, each screw 53 being provided with a point which enters a conical housing which is extended by a supply channel 54 provided with the central mandrel 50 and located on the axis of the screw 53. As shown in French patent application no. 73 39885 filed on Nov. 9, 1973, in the name of the assignees, these arrangements enable the material to be supplied at a high yet steady flow rate, and reduces the risk of dead areas and consequent pollution of the material by picking up deposits.

Figure 4:
FIG. 4 is a section on enlarged scale of a portion of the profile of a screw in FIG. 1.

FIG. 4 shows the profile of a screw on a larger scale. The flow rate at which the material is supplied is so regulated that, at the level of the supply orifices 5, material is deposited only in the bottoms of the threads. This deposit in the form of a thin layer favors degassing.

As the material moves downstream, it inevitably fills up the threads. Consequently, it will be understood that in conventional machines such as that described in French patent no. 1,442,473 mentioned above, the time for which the material is, exposed to vacuum is in practice, less than one minute. In fact, relatively hollow threads must be used to obtain sufficient flow, and these fill up fairly rapidly. The layer of material spread over the periphery of the screws thus increasing in the thickness and the efficiency of degassing decreases since only the bubbles near the surface can reach the surface and burst.

Use of the above described device enables the time for which the material remains subjected to vacuum to be considerably increased, with the material remaining in the form of a thin layer. In point of fact, since four screws are used, the surface area over which the material is spread is increased, so that smaller screws with shallower threads can be used for the same rate of flow. Moreover, since the screws rotate in the same direction, there will be a turning over of the material at each point tangential to the screws. There will thus be in practice, four turnings over for each pitch. The time for which the material remains under vacuum is thus increased for a given length, and in this way the time can be increased to 10 to 20 minutes. Furthermore, the turning over of the material due to the meshing of the screws eases degassing, since a new portion of the material comes close to the free surface each time the material passed from one screw to another.

Also, the manner of feeding the screws which has been described, which enables a tubular sausage of material to be brought into contact with each screw, facilitates the formation of a thin layer and improves the degassing.

It will be noted that large diameter degassing orifices have been used. With this arrangement, part of each screw passes before a degassing orifice. Correct degassing is thus obtained even if, following a blockage, the material backs up as far as the degassing orifice.

The invention is, of course, not intended to be limited to the details of the embodiment which has just been described, but covers all modifications and improvements thereof. Thus the supply of material could be carried out at several points, for example spaced along the length of the screw.

I claim:

1. A device for degassing plastic material comprising an extruder including at least three parallel screws which intermesh in pairs, a casing surrounding said screws, said casing having opposite ends, a central stem extending axially in said casing and around which said screws are arranged, said casing having inner semi-cylindrical surfaces which surround a portion of the periphery of a respective one of said screws, said central stem having outer semi-cylindrical surfaces surrounding a remaining portion of the periphery of the respective screws such that each screw is substantially enclosed in entirety by said casing and central stem, said casing defining supply orifice means for supplying plastic material to said screws and degassing orifice means operatively associated with a suction source for removing gas from said plastic material, means operatively associated with said screws for rotating said screws in the same direction to feed material from said supply orifice means to one end of said casing, an end plate closing said one end of said casing and defining channel means for removing plastic material from said casing, said degassing orifice means being upstream of said supply orifice means with respect to the direction of feed of plastic material, said degassing orifice means comprising a degassing orifice centered in a plane tangential to each pair of said screws, said degassing orifice having a diameter at least equal to the distance between the axes of said pair of screws.

2. A degassing device according to claim 1, wherein said supply orifice means includes a plurality of supply orifices arranged around said axis of said casing.

3. A degassing device according to claim 2, wherein each said supply orifice has an annular section, and is constituted by a supply conduit including a tube, and a central mandrel of smaller diameter than said coaxially disposed in said tube.

4. A degassing device according to claim 1, wherein the axial distance between said supply and degassing orifices means is between 4 and 8 times the pitch of said screws.

5. A degassing device according to claim 1, wherein said supply orifice means comprises a supply orifice for each screw and means are provided for supplying said orifices simultaneously in pairs.

* * * * *